(12) United States Patent
Yamamoto

(10) Patent No.: US 6,827,895 B1
(45) Date of Patent: Dec. 7, 2004

(54) METHOD OF MAKING A PLURAL COMPONENT SHOW FACE TRIM PART

(76) Inventor: Hiroaki Yamamoto, 55 Robert Wright Dr., Brookville, OH (US) 45309-1902

( * ) Notice: Subject to any disclaimer, the term of this patent is extended or adjusted under 35 U.S.C. 154(b) by 127 days.

(21) Appl. No.: 10/225,791

(22) Filed: Aug. 22, 2002

Related U.S. Application Data
(60) Provisional application No. 60/325,597, filed on Sep. 28, 2001.

(51) Int. Cl.[7] ............................................... B29C 45/14
(52) U.S. Cl. ...................... 264/266; 264/267; 264/268; 264/275
(58) Field of Search ................................. 264/259, 266, 264/267, 268, 271.1, 274, 275; 156/196, 214; 428/31, 119, 122

(56) References Cited

U.S. PATENT DOCUMENTS

| | | | |
|---|---|---|---|
| 5,429,786 A | * 7/1995 | Jogan et al. ................ | 264/255 |
| 5,599,608 A | 2/1997 | Yamamoto et al. | |
| 5,639,405 A | 6/1997 | Erikson | |
| 5,674,445 A | * 10/1997 | Van Ert ..................... | 264/249 |
| 5,746,962 A | 5/1998 | Yamamoto | |
| 5,759,464 A | * 6/1998 | Matsumoto et al. ........ | 264/138 |
| 5,759,477 A | * 6/1998 | Yamamoto .................. | 264/513 |
| 5,783,287 A | 7/1998 | Yamamoto et al. | |
| 5,804,117 A | * 9/1998 | Baba et al. ................ | 264/161 |
| 5,811,053 A | * 9/1998 | Ota et al. .................. | 264/511 |
| 5,968,444 A | * 10/1999 | Yamamoto .................. | 264/519 |
| 6,168,742 B1 | 1/2001 | Yamamoto | |
| 6,436,329 B1 | * 8/2002 | Hardgrove et al. ......... | 264/266 |
| 6,464,917 B1 | * 10/2002 | Piec et al. ................. | 264/161 |
| 6,638,467 B1 | * 10/2003 | Yamamoto .................. | 264/263 |

* cited by examiner

Primary Examiner—Angela Ortiz

(57) ABSTRACT

A method for insert-molding a plural color film laminate part and part made by the method. The method comprises preforming a film laminate and subsequently insert-molding a plastic substrate against the preformed film laminate. An improvement in traditional insert molding techniques is provided by use of a specific mold cavity structure which facilitates positioning of the film laminate transition line(s) between colors within longitudinally extending groove(s) in the part show face. According to one embodiment, the film laminate is preformed with a re-entrant edge portion which is positioned within the mold cavity such that the edge of the plastic substrate will be substantially covered. The insert molding step involves positioning the preformed film laminate in a specially configured mold cavity, closing the mold and injecting molten resin into the mold cavity against the film laminate. The part includes a show surface having the paint film laminate superposed over a portion of the underlying substrate with a portion of the substrate exposed to provide a plural color or plural component aesthetic effect. The boundary between the paint film laminate and substrate, on the show surface, is defined by a channel into which an edge of the film laminate is tucked.

14 Claims, 13 Drawing Sheets

METHOD OF MAKING A PLURAL COMPONENT SHOW FACE TRIM PART

CROSS-REFERENCE TO RELATED APPLICATION

This application claims the priority benefit of U.S. Provisional Patent Application No. 60/325,597 filed Sep. 28, 2001.

BACKGROUND OF THE INVENTION

The present invention pertains to improved methods of insert molding a film laminate, or the like, over a portion of a plastic substrate and to the parts made thereby.

A variety of film laminate injection molded parts have been made and used for automobile body and trim parts. For example, bumpers, body panels, doors, filler panels, wheel covers, dashboards, armrests and other parts have been made via injection molding techniques. Additionally, with regard to automobile exteriors, bodyside trim moldings, beltline moldings, roof moldings and window moldings are made via injection molding of polyvinylchloride (PVC) or other thermoplastic materials.

In order to provide a painted surface for these parts, film lamination techniques are commonly employed. In accordance with these processes, a paint film laminate is insert molded with the desired thermoplastic to fuse the film laminate over the injection molded part. The resulting injection molded part is ready for assembly without subsequent painting.

The paint film laminate used in these insert molding techniques may comprise a backing sheet to which paint layers are adhered to form a colored side of the laminate. Typically, the backing sheet comprises an extruded thermoplastic sheet. In such paint film laminates, a paint film, comprising a cast dried continuous paint coating, is provided over the backing sheet. The paint film laminate may consist of a monocoat, a clear coat over a base coat, or a clear coat and a base coat with interposed print or design. The paint film laminate, including base coat, clear coat and print or design, if desired, may, for example, range from about 0.5–4 mil. in thickness.

The laminated paint films are typically provided in a roll, unwound, then trimmed to a proper "preform" size and shape, ready for insertion into the injection mold. The preform is usually placed along the cavity side of the mold with the painted side thereof facing the mold cavity surface.

In some instances, the pre-sized paint film laminate may be placed along the core side of the mold. The mold is then clamped and the desired molten resin is injected into the mold cavity. Heat and pressure conditions in the mold partially melt the backing sheet and a melt bonding or fusion of the injected resin and film laminate occur. Injection molds used for these processes are commonly rear or edge gated so that the molten resin is directed along the backside of the film laminate, pressing the show face side of the film laminate against the surface of the mold cavity. Techniques utilized to insert mold plastic parts covered by such paint film laminates are disclosed, for example, in U.S. Pat. Nos. 5,599,608; 5,783,287; 5,746,962 and 6,168,742 of common assignment herewith. The subject matter of these disclosures is incorporated by reference herein.

It has become increasingly popular to insert or co-mold bumper, rocker panel, side trim, and chin spoiler parts for autos and trucks which incorporate a paint film laminate over only a portion of the show surface of the part with the remainder of the underlying plastic substrate being exposed so as to present a plural color or plural component show surface appearance.

Conventionally employed insert molding techniques for manufacturing such plural colored film laminate parts often result in an unsightly appearance wherein the border between the paint film and the exposed substrate presents an uneven or wavy appearance on the show surface that stands in sharp contrast to the desired straight line or clean edge appearance that is intended and which must be achieved if the part is to be classified as a Class "A" show part. This undesirable appearance may be caused, for example, by shrinkage of the paint film laminate during the insert molding process.

Accordingly, there remains a need in the art to improve upon the existing methods for insert molding of film laminates over plastic substrates in such manner that the border area of the laminate that is disposed on the show face of the part provides for a sharp, linear distinction between the film laminate surface and the exposed substrate surface.

SUMMARY OF THE INVENTION

These and other objects of the invention are met by the instant methods and fused film laminate plastic parts made thereby.

In accordance with the present invention, a film laminate part is insert molded utilizing a specifically configured mold cavity. The method includes the steps of providing a film laminate and subsequently insert molding a plastic substrate against the non-show-face side of the preformed film laminate. A film laminate preforming step may be used and involves shaping an unformed film laminate in a specially configured vacuum mold and subsequently trimming the shaped film laminate to obtain the preformed film laminate, with insert or edge portions, to be insert molded. The insert molding step involves positioning the preformed film laminate in a specially configured mold cavity such that the insert or edge portion thereof, to be disposed on the show face, is located adjacent a groove forming member within the mold cavity, closing the mold and injecting molten thermoplastic or thermosetting resin into the mold cavity against the non-show face side of the film laminate.

Improvement in traditional insert molding techniques is provided by utilization of a specific mold cavity structure with a ridge-like groove forming member(s) therein which facilitates disposition of each paint film laminate insert or edge portion to be disposed on the show face of the part, within a separate groove which extends along the show face side of the resulting part. The mold cavity is equipped with a groove forming member(s) which align with the insert or edge portion(s) of the paint film laminate to be disposed on the show face of this part. Each groove forming member is configured with a predetermined depth to width ratio which results in the film laminate edges being disposed within the groove(s) such that the viewer will see only the film laminate at the point where it crests the entrance to the resulting groove and not the actual edge line located near the nadir of the groove.

In one embodiment of the present invention, the film laminate covers at least one edge of the underlying substrate. In this case, the film laminate may be preformed with a reentrant longitudinal edge portion, in accordance with the '287 patent to Yamamoto and the like, such that the re-entrant longitudinal edge portion of the film laminate covers the associated longitudinal edge of the plastic substrate.

The invention will be further described in conjunction with the appended drawings and following detailed description.

DETAILED DESCRIPTION OF THE INVENTION

Figure 1:
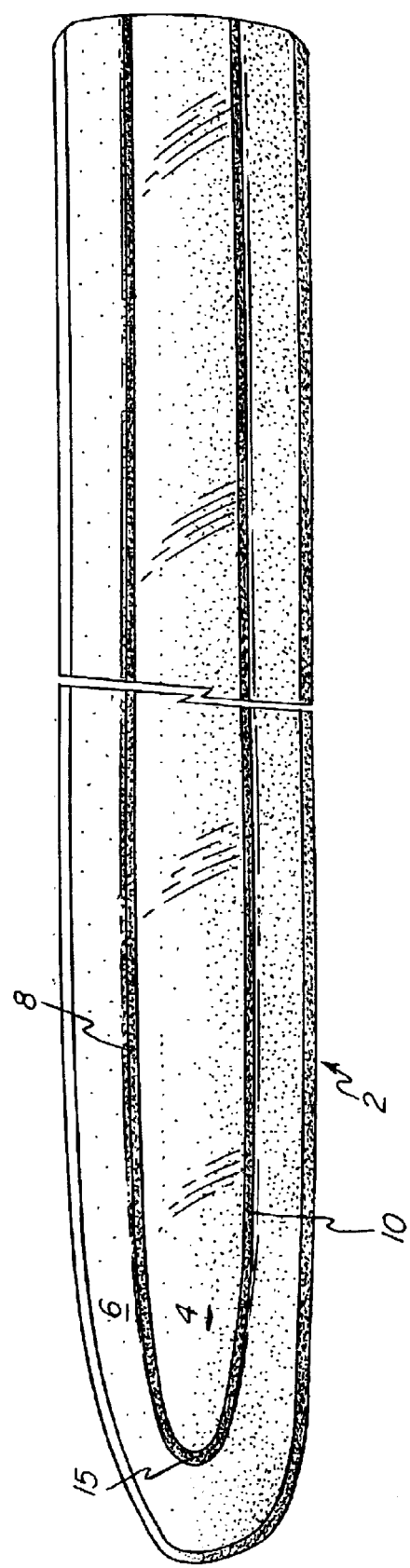
FIG. 1 is a plan view of the show surface of a paint film laminate part in accordance with the invention.

Turning now to FIG. 1, there is shown an automotive part 2 in accordance with the invention. Here, the show surface of the part is depicted. The show surface comprises one color imparting member 4, namely a paint film laminate overlying an exposed portion 6 of the substrate plastic material. Separating the paint film laminate 4 from the exposed substrate 6 are boundary members 8, 10, and 15. These members are formed as channels in the substrate, and edge portions of the paint film laminate 4 are disposed in these channels.

In this way, the color boundary existing between the paint film laminate 4 and exposed substrate 6 presents an even, aesthetically pleasing appearance on the show side of the part. In contrast to the situation wherein a laminate is directly laid over the substrate with no boundary channels, the part of the present invention provides for a sharper, more distinctive color boundary interface. As shown in FIG. 1, channels 8 and 10 are substantially parallel and are connected to each other by the provision of a generally semi-elliptical or semi-circular configured connecting channel 15.

Figure 2:
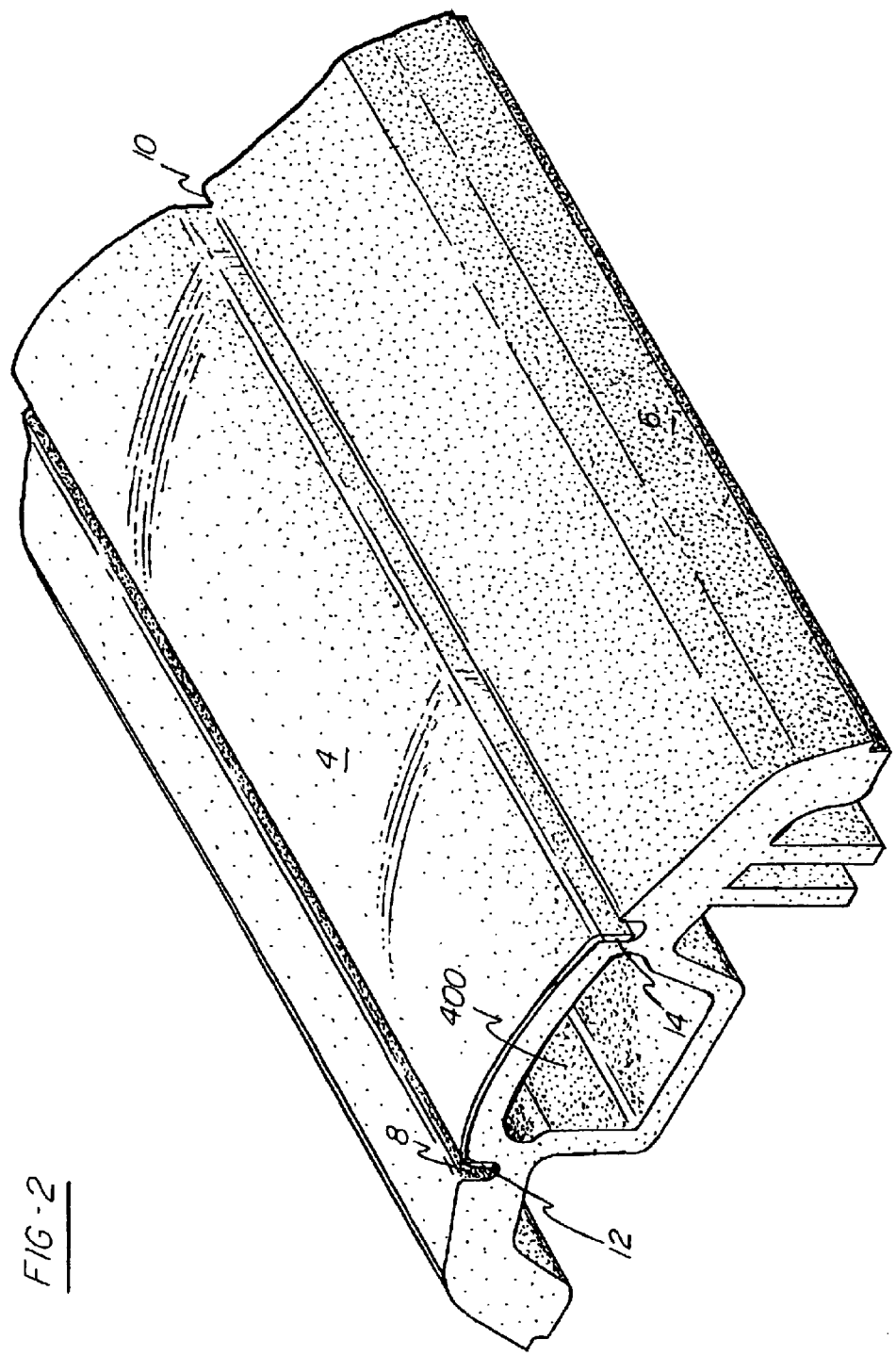
FIG. 2 is a partially cut-away perspective view of the paint film laminate part shown in FIG. 1.

Turning now to FIG. 2, a cut-away perspective view of a portion of the part shown in FIG. 1 is depicted. Here, the longitudinal edge portions of the paint film 4, namely edges 12 and 14, are clearly disposed within the channel members 8 and 10, respectively. Thus, the boundary existing between the paint film 4 and exposed substrate 6 again provides an aesthetically pleasing appearance since the edges 12, 14 are tucked or disposed within the channels along the color interface borders. A core 400 is centrally located in the part and extends along most of the length of the part. The core may be formed in conjunction with normal gas assisted molding techniques. For instance, after the plastic has been injected into the mold in the insert molding technique, a shot of pressurized gas may be admitted through the sprue or other entry means to hollow or "core-out" the part. The artisan may review U.S. Pat. No. 5,639,405, incorporated by reference herein, to glean details pertaining to optimized methods for forming the hollowed-out sections or cores.

Figure 3:
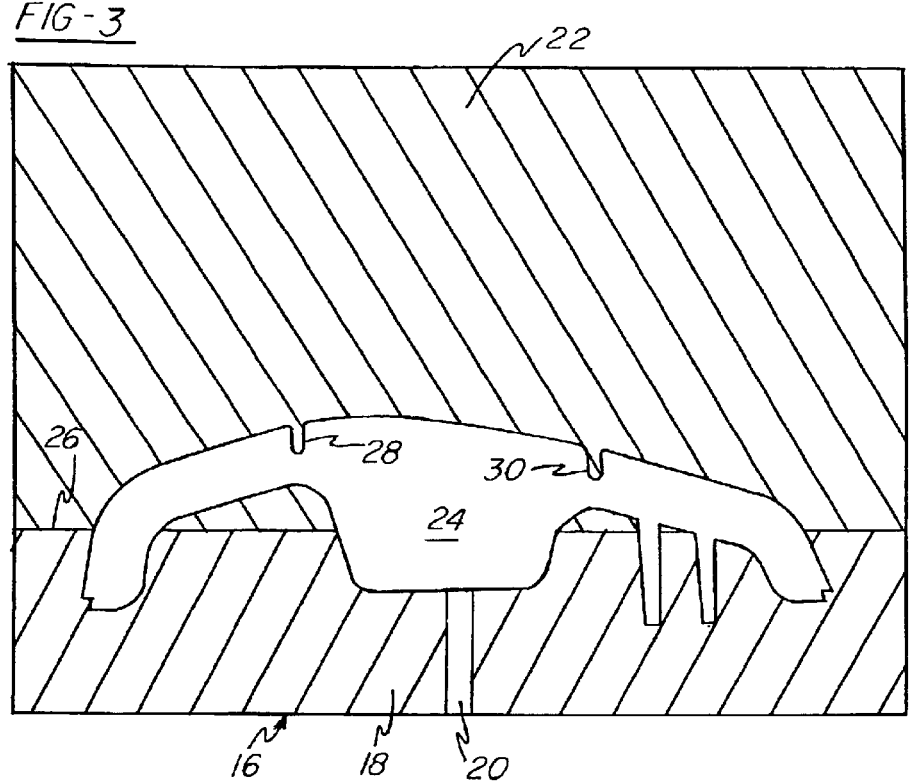
FIG. 3 is a cross-sectional view of a mold to be used in accordance with the invention to make a part such as that shown in FIG. 1.

FIG. 3 shows a mold apparatus 16 of the type that may be utilized to make the part shown in FIG. 2. Here, mold apparatus 16 comprises a mold cavity 24 that is defined by male mold member 22 and female mold member 18. As shown, the mold cavity opens along parting line 26. Depending from the surface of the male mold member 22 are a pair of ridge-like projections 28, 30, extending into the mold cavity from the male mold surface. These projections are necessary in order to make the boundary channels 8, 10 in the substrate upon the insert molding step. Gate 20 is provided for entry of thermoplastic or thermoset material into the mold cavity.

Figure 4:
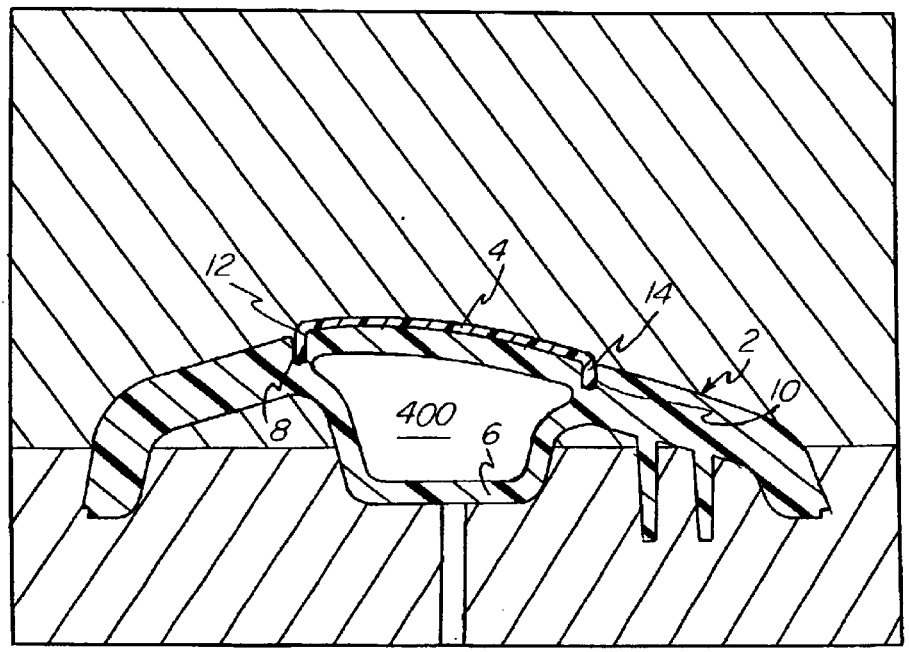
FIG. 4 is a cross-sectional view of the mold depicted in FIG. 3 with the film laminate and plastic in place.

FIG. 4 shows the mold cavity of FIG. 3 in the insert molding stage wherein the mold cavity is supplied with thermoplastic or thermoset substrate material 6, and the paint film laminate 4 is disposed over the substrate on the show side of the part. Here, it can be seen that the longitudinally extending edges 12, 14, of the paint film laminate are placed securely in between projections 8 and 10 of the male mold cavity. In this way, the paint film 4 is held snugly in place during the molding process and, upon ejection of the part from the mold, these edge portions are disposed in the respective boundary channels 8, 10 that are found in the part (see FIG. 2).

Figure 5:
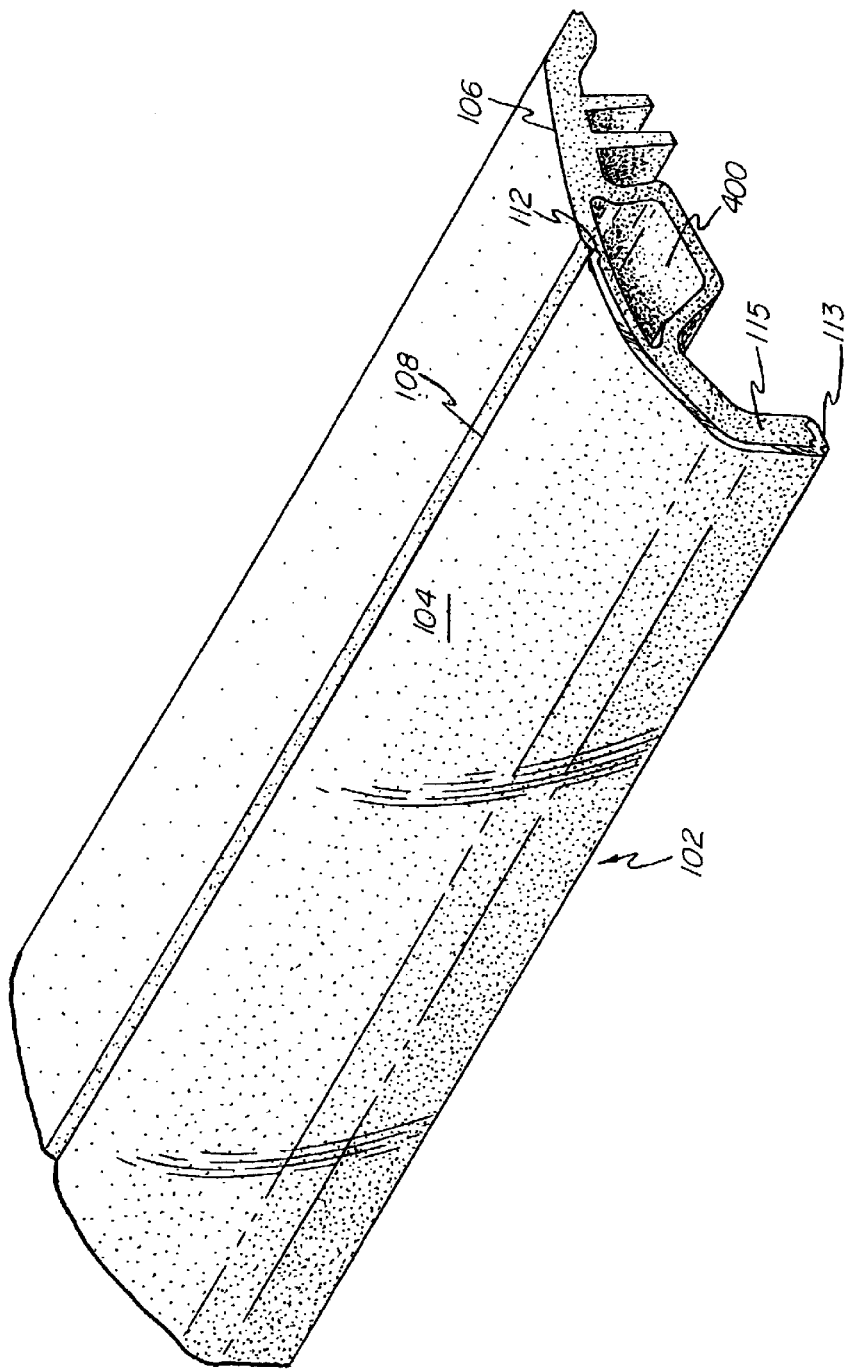
FIG. 5 is a partially cut-away perspective view of a second embodiment of a paint film covered part in accordance with the invention.

Turning now to FIG. 5, there is shown another embodiment of the invention wherein the show surface of the automotive part 102 comprises a bicomponent or two-color combination. Here, one of the components is the paint film 104 with the exposed substrate 106 being shown on the far show side of the part as appears in FIG. 5. Note here that one of the longitudinally extending edges 112 of the paint film laminate is disposed in the longitudinally extending border channel 108, which channel extends longitudinally along the substrate material. The other longitudinally extending edge 113 of the laminate covers the corresponding longitudinal edge 115 of the part in accordance with the procedures described in U.S. Pat. Nos. 5,746,962; 5,599,608 and 5,783,287.

Figure 6:
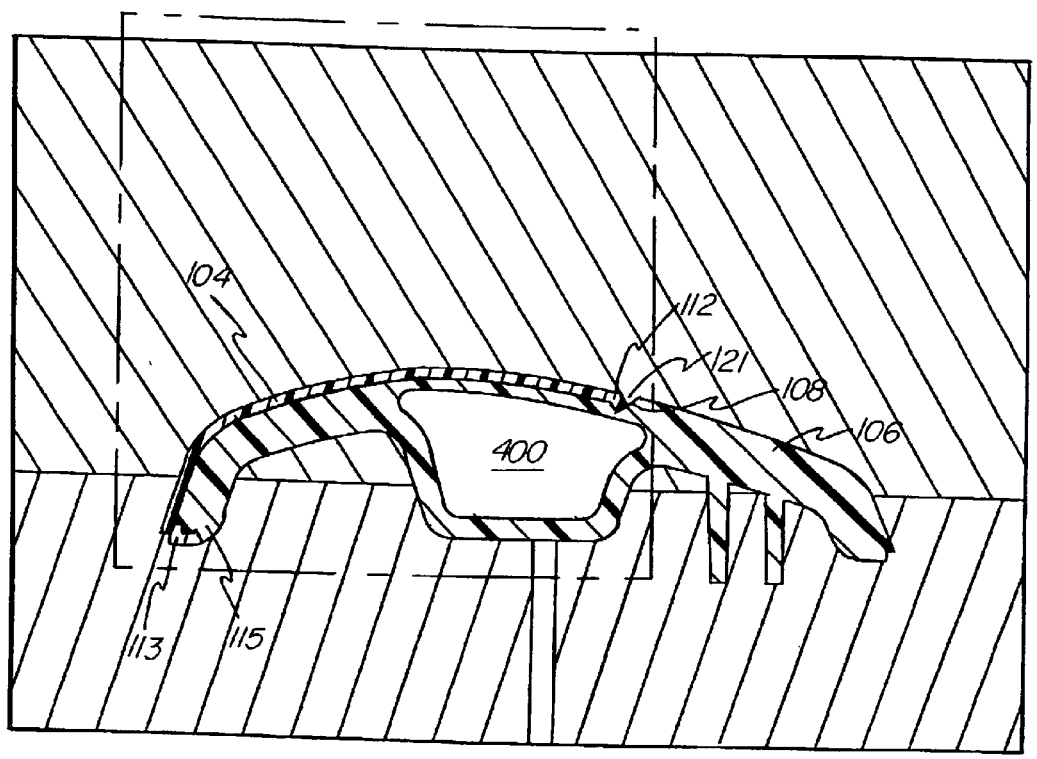
FIG. 6 is a cross-sectional view of a mold utilized to make the part shown in FIG. 5.
Figure 7:
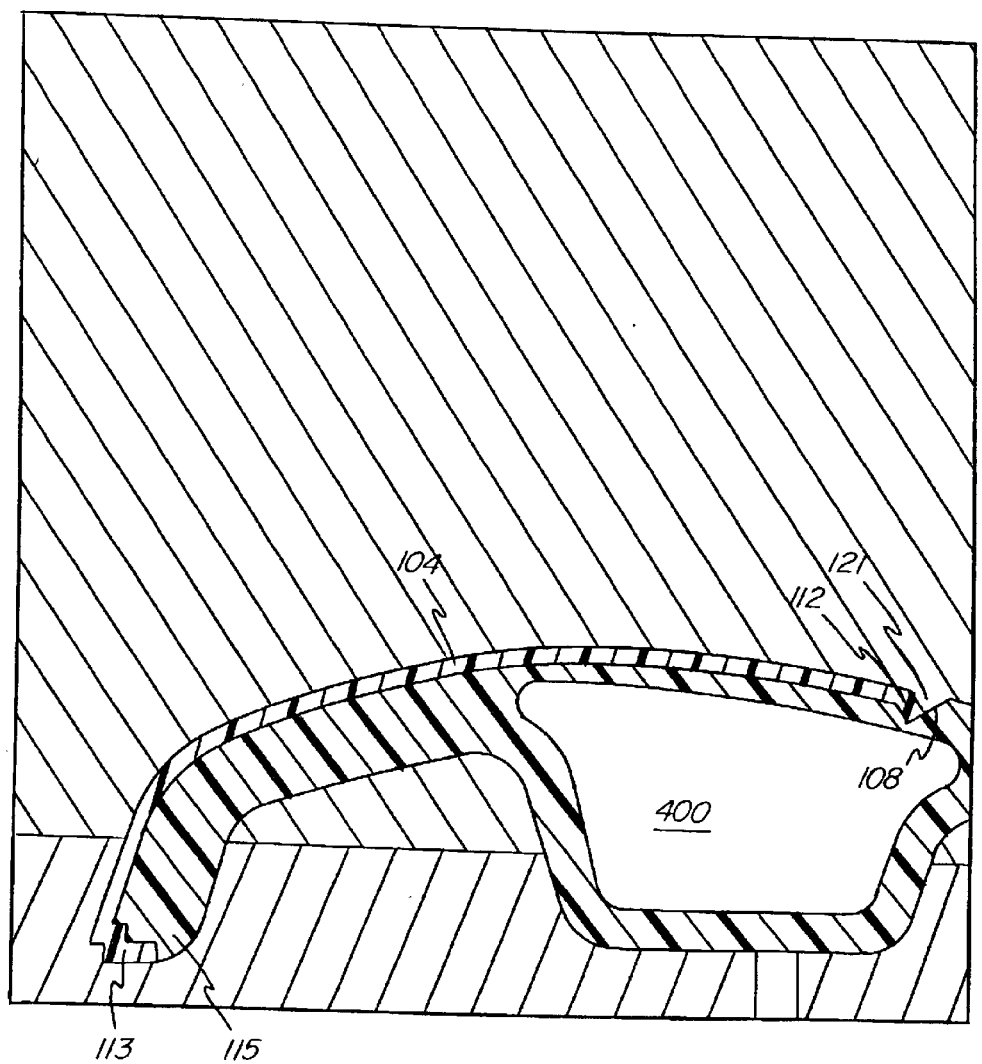
FIG. 7 is an exploded sectional view of a portion of the mold shown in FIG. 6.

FIGS. 6 and 7 show cross-sectional views of the mold cavity utilized to make the part shown in FIG. 5. Here, it can be seen that a ridge-like projection 121 is provided in the male mold cavity so as to form, upon molding, the border channel 108 shown in the part of FIG. 5. As shown, edge 112 of the part is disposed within this border channel 108 that extends longitudinally along the axis of the part.

Figure 8:
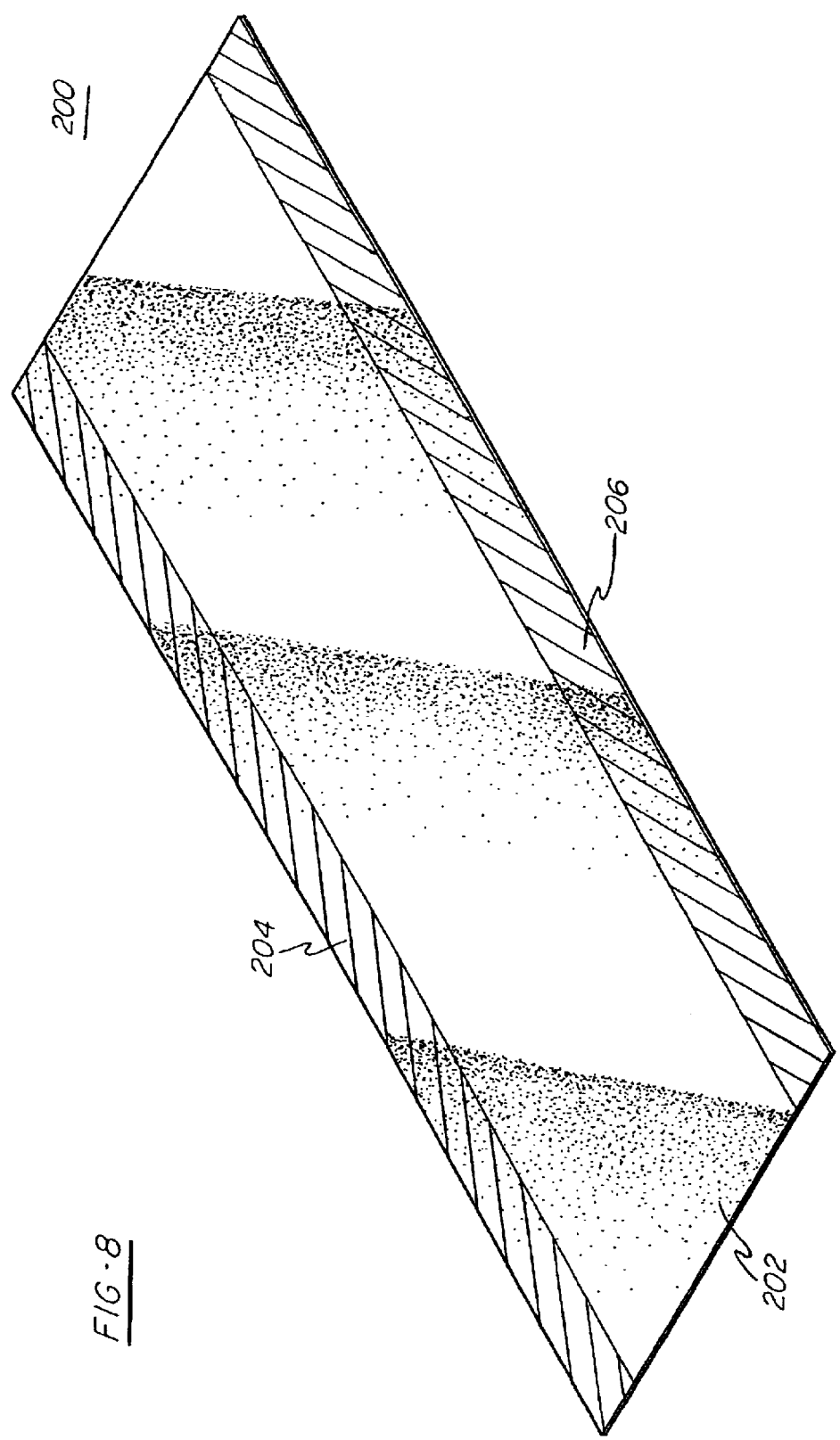
FIG. 8 is a perspective view of another embodiment of a paint film laminate that may be used to form a paint film laminate part in accordance with the invention.

FIG. 8 shows another embodiment of a paint film laminate that may be utilized in accordance with the invention to provide a plural color arrangement over the exposed substrate area of the part. Here, the paint film laminate 200 comprises a first color section 202 located intermediate additional color sections 204, 206. It can be well understood that individual colors could be imparted for each of the sections 202, 204, 206, or, as presently preferred, the portion 202 has a first main color with the smaller area sections 204, 206 being supplied with a second color.

Figure 9:
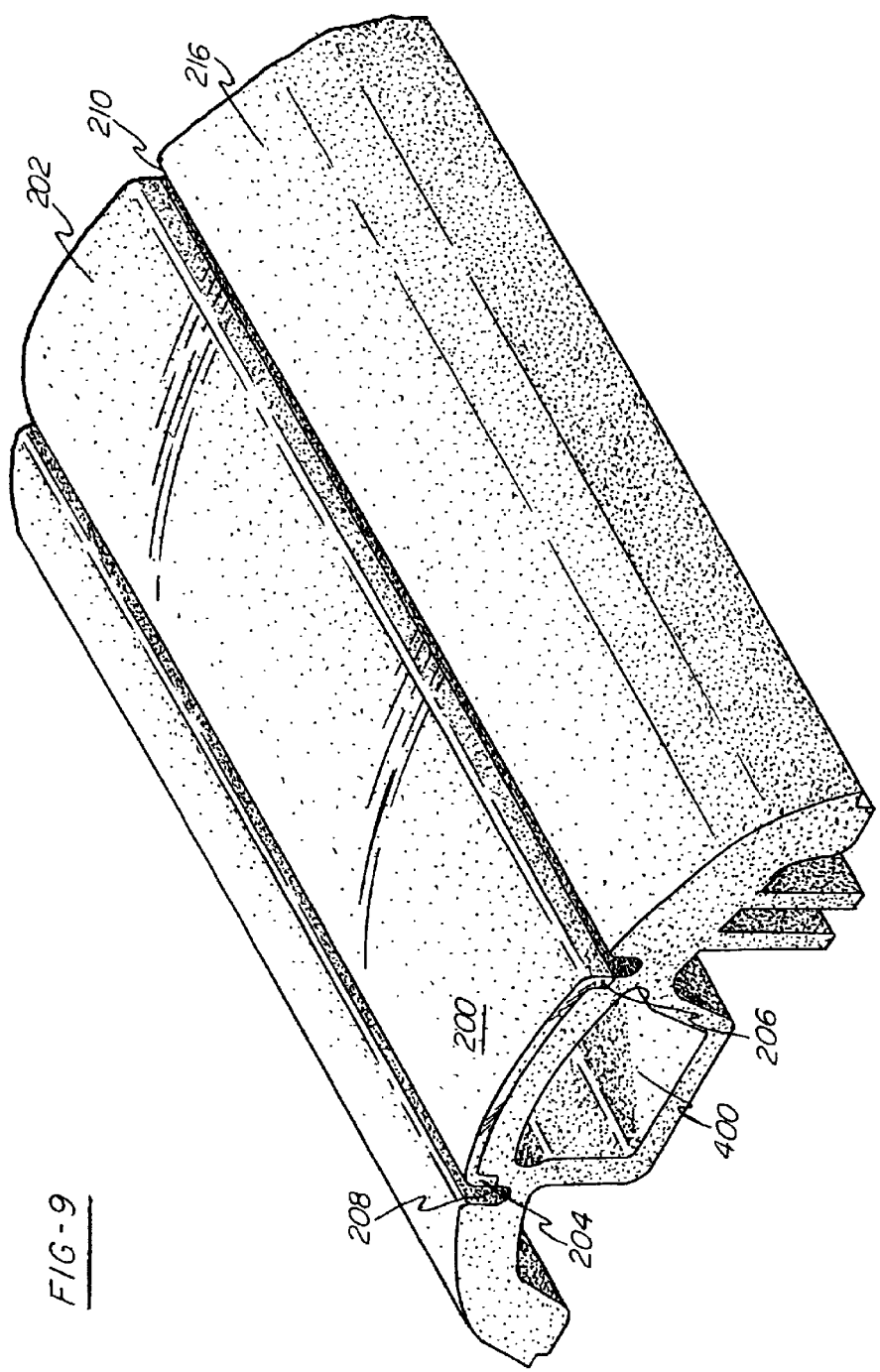
FIG. 9 is a partially cut-away perspective view of a part made by insert molding of the paint film laminate shown in FIG. 8 over the underlying substrate.

The techniques employed to form the part shown in FIG. 2 are then employed in conjunction with the paint film laminate 200 to provide the part shown in FIG. 9. That is, the mold cavities depicted in FIGS. 3 and 4 are simply utilized in conjunction with the second paint film laminate embodiment of FIG. 8 to make the part shown in FIG. 9. The additional color sections 204, 206 are provided with intermediate color section 202; all of which are disposed on top of the substrate 216. Accordingly, the colors presented by this part include the substrate color 216, the first color 202 and its bordering colors 204, 206. As mentioned previously, it is presently preferred that the colors 204, 206 match. Here again, the sections 204, 206 of the paint film laminate are tucked within the corresponding boundary channels 208, 210 formed in the part.

Figure 10:
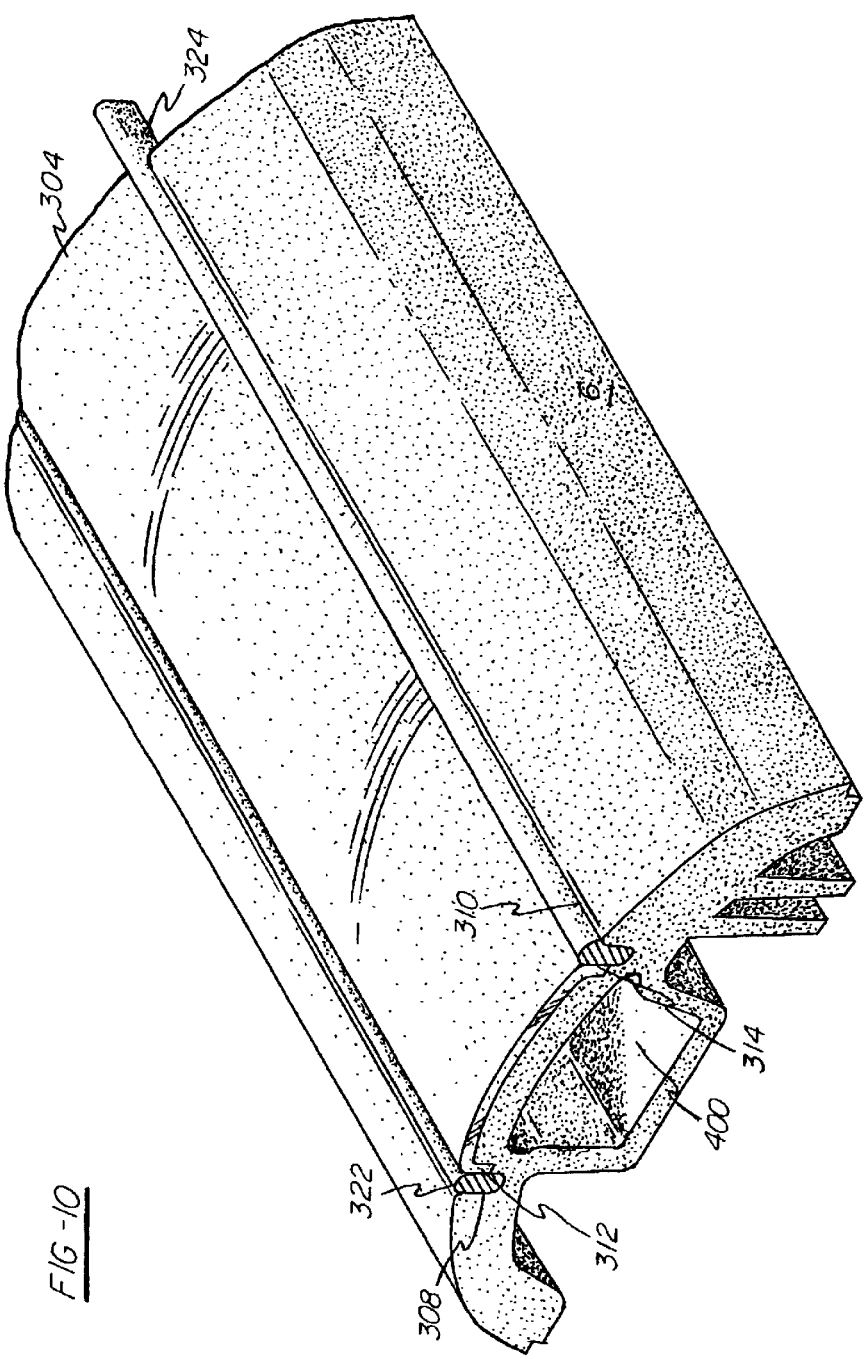
FIG. 10 is a partially cut-away view of another embodiment of a part made in accordance with the invention.

FIG. 10 shows another embodiment similar to that shown in FIGS. 2 and 9. Here, a single color paint film laminate 304 may be provided with the longitudinally extending ends 312 and 314 thereof disposed in channel boundary 308, 310. Additionally, so as to impart a different appearance or different color pattern, colored rope-like strands or extrusions 322, 324 are also disposed snugly or wedged within the boundary channels 308, 310. The use of the strands 322, 324 not only serves the purpose of providing additional aesthetic enhancement for the show surface of the part, but the resilient nature of the strands helps to hold the laminate 304 firmly in place. These strands may comprise, for example, circular or oblong cross-sectional extrusions, or textile filaments and the like adapted for snug reception in the grooves or channels.

Figure 11:
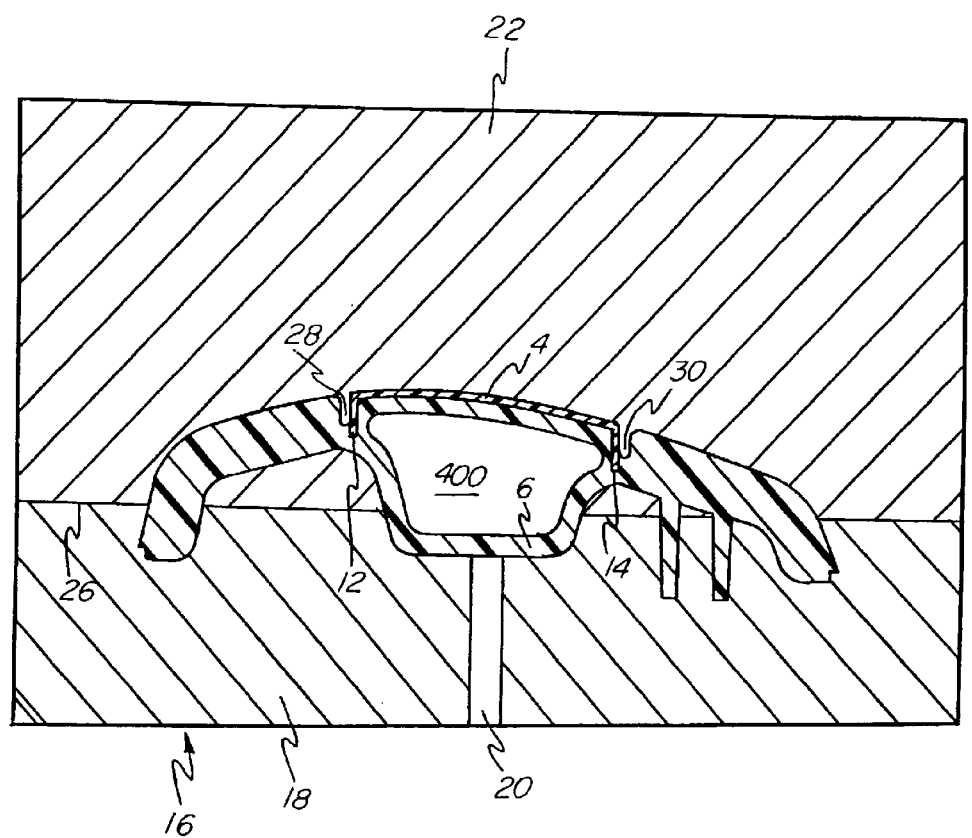
FIG. 11 is a cross-sectional view of a mold cavity with paint film and plastic disposed therein similar to that shown in FIG. 4 with the exception that a wider film has been placed in the mold cavity, thereby embedding the edges of the laminate deeply into the plastic substrate.

In FIG. 11, there is a variation of the part depicted in FIG. 2. Here, in the molding process, the paint film laminate itself is wider than that shown in FIG. 4. This results in the ends 12, 14 of the laminate being embedded deeply within the plastic matrix 6. Stated differently, the ends 12, 14 extend below the ridge-like projections 28, 30 formed in the male mold surface so that these ends are embedded in the plastic matrix beneath the nadirs of the channels 8, 10. As shown, the edge extends along the inboard wall of the channels and is buried in the plastic matrix at a location beneath the nadirs of the channels.

Similarly, in the embodiment shown in FIG. 12, the paint film laminate is wider than that shown in FIG. 4, but here the ends 12, 14 of the laminate extend below the projections 28, 30 and are upwardly curved to wrap around these projections. In order to provide this structure, it is desired to preform the paint film so as to have the upwardly curled edges in a vacuum preforming operation.

Figure 12:
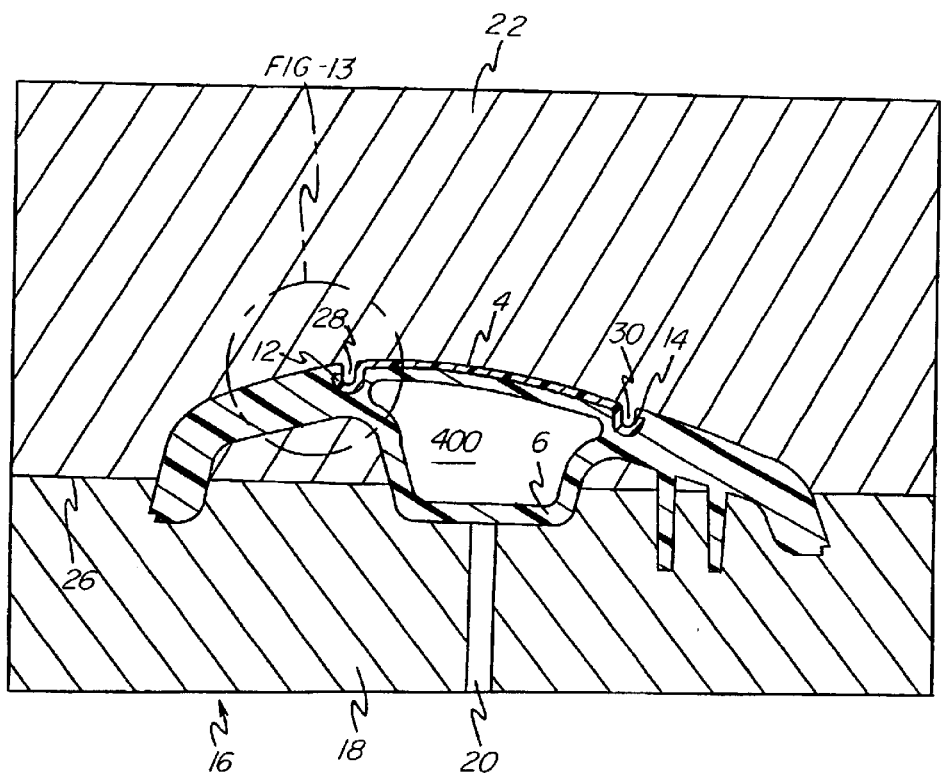
FIG. 12 is a cross-sectional view of a mold cavity with paint film laminate positioned therein, similar to FIG. 11, but showing another embodiment of the invention.

The embodiment in FIG. 12 provides an aesthetically pleasing appearance for the part. At the same time, the edges of the laminate in the molded part will be secure in position as they pass around or are wrapped around the nadir of the channels 8 and 10 and are embedded in the upstanding outboard wall of the generally two-walled or U cross-sectioned channels.

Although the paint films herein described have been noted as having colored sections, the use of metallic flake containing films having aluminum or gold or often metallic appearances can also be used to provide class "A" show parts. One popular film provides a chrome-like appearance and may also be used in accordance with the invention as the member 4. Thus, such metallic-type finishes are to be construed as within the ambit of the invention, and the phrases "paint film," "paint film laminates," "film laminate," and "film" are used interchangeably and also include these metallic finishes within their intended construction.

Figure 13:
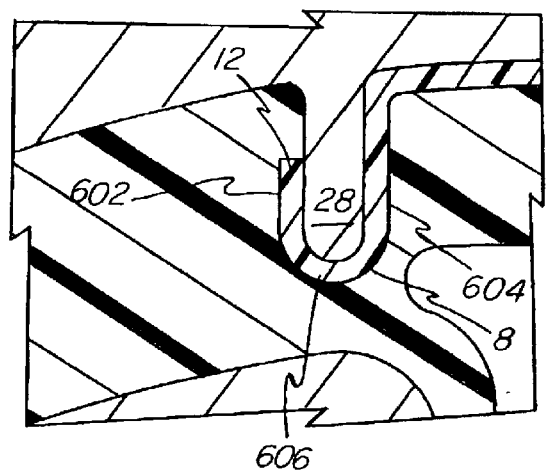
FIG. 13 is a magnified portion of the view shown in FIG. 12 clearly depicting the cross-sectional shape of the ridge-like projection 28 depending from the mold cavity surface and the congruent channel formed in the part.

Turning now to FIG. 13, it can be seen that the ridge-like projection 28 and congruent channel member 8 have a cross-sectional configuration in the form of a substantially "U" shape. Laterally opposed upstanding sides of the channel are shown as 602, 604 with these outboard and inboard sides interconnected at the bottom or nadir of the channel by a radiused connected leg 606. As shown, the end 12 of the film, in this embodiment, extends downwardly along one of the laterally opposing walls or sides of the channel, covering the entire nadir of the channel juxtaposed along the connecting leg of the projection and then turns upwardly along the outboard upstanding wall of the channel.

Figure 14:
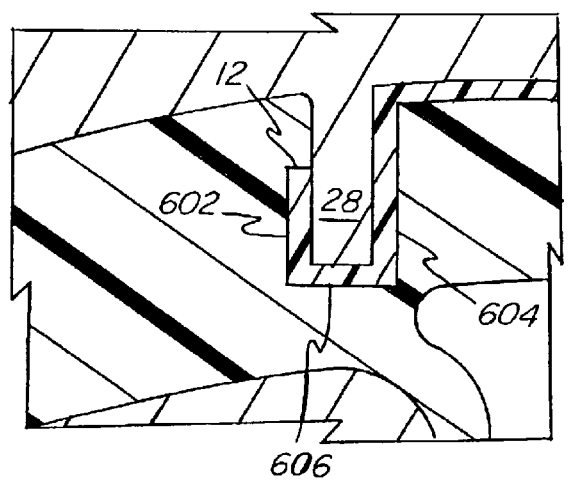
FIG. 14 is a view similar to FIG. 13 but showing another embodiment of the ridge-like projection 28 and contiguous paint film arrangement.

In the embodiment shown in FIG. 14, the projection and congruent groove are in the shape of a squared channel wherein laterally opposed upstanding sides 602, 604 are substantially parallel to each other, with each joined to the connecting leg 606 at a normal angle. Here, the end 12 of the film is wrapped around the squared legs of the groove and extends upwardly along the upstanding outboard leg 602 of the groove that is along the outboard groove side.

Figure 15:
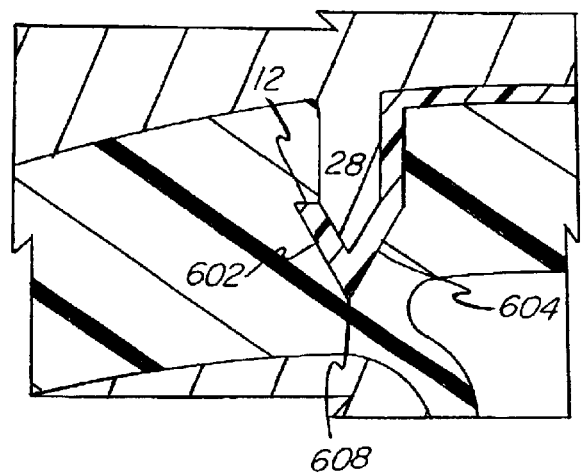
FIG. 15 is a view similar to FIG. 13 but showing yet another embodiment of the ridge-like projections and contiguous paint film.

FIG. 15 shows yet another embodiment wherein legs 602, 604 are positioned in the form of two sides of a triangle, converging at the channel or vertex 608. The film here extends along the inboard edge of the groove, dips into the vertex, and then the end 12 terminates upwardly along the outboard upstanding leg 602.

The artisan will appreciate that a myriad of possible cross-sectional configurations for the ridge-like projections and congruent channels formed in the part may exist.

Figure 16:
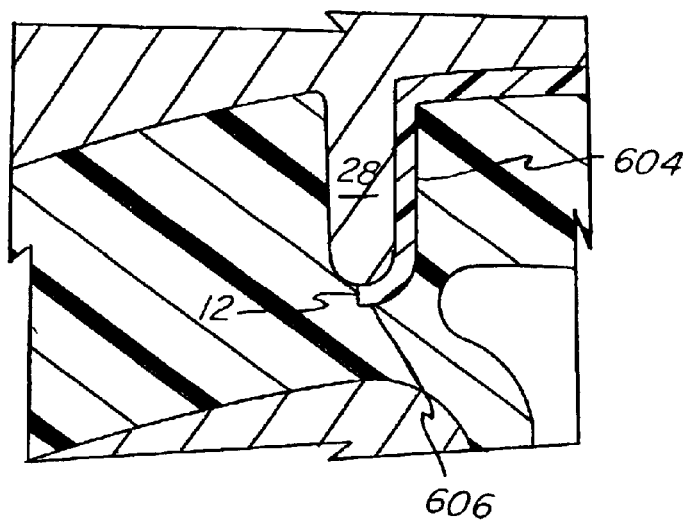
FIG. 16 is a view similar to FIG. 13 but showing yet another embodiment of the ridge-like projections and contiguous paint film.
Figure 17:
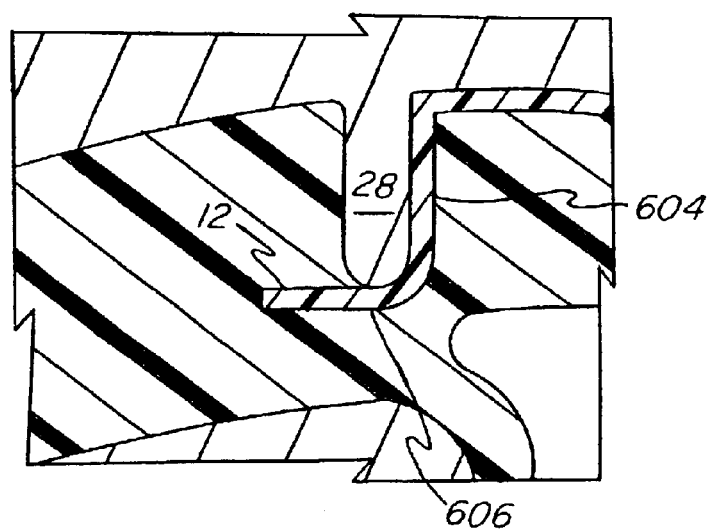
FIG. 17 is a view similar to FIG. 13 but showing yet another embodiment of the ridge-like projections and contiguous paint film.

Another embodiment is shown in FIG. 16 wherein the end 12 of the film terminates at the bottom or nadir of the channel. In contrast, in FIG. 17, the end 12 of the film passes around the nadir and extends laterally along a substantially linear tangent generally parallel to the nadir and at a substantially normal angle to the longitudinal axis of the ridge 28.

It is apparent that the methods herein referred to result in the provision of an automotive part which includes a plastic substrate having a show surface with a paint film laminate disposed over a portion of the show surface of the part to reveal a portion of the substrate on the show surface. In order to manufacture such a part, a mold cavity is provided that has a surface area thereof interrupted by a ridge-like protrusion. The paint film laminate is positioned in the mold so that an edge of the paint film laminate is disposed alongside of the ridge-like protrusion in the mold cavity. Upon injection of the molten thermoplastic or thermoset into the mold cavity and behind the paint laminate, the molten plastic extends under the paint film alongside the ridge-like protrusion. This ridge-like protrusion upon contact with the paint film laminate and the molten plastic forms a channel in the molten plastic with the edge of the paint film laminate tucked into this channel. If desired, the part may be "cored-out" or provided with a hollowed cross section by injection of pressurized gas into the cavity, normally at a time after the plastic melt has been injected.

In the preferred method, the mold cavity comprises a surface area that is interrupted by a first and second ridge member with those ridge members being separated by a space extending along the mold cavity surface. The paint film laminate comprising a pair of edge portions is positioned in that space with each of the opposing edges of the paint film laminate disposed adjacent one of the ridge members. Upon injection of the molten plastic or thermoset into the mold cavity and behind the paint film laminate, the molten plastic extends under the paint film laminate along the space and the ridge members. These ridge members, upon contact with the molten plastic and the paint film laminate, form a pair of channels in the molten plastic with each of the respective edge portions of the paint film laminate tucked into one of these channels.

Although the instant invention emphasizes use of a single paint film piece, the skilled artisan will readily appreciate that a plurality of separately colored plastic strips or the like may also be employed with the associated insert portions extending longitudinally along each said strip firmly anchored in the plastic substrate in a groove or channel member similar to the groove 8 shown in FIG. 1.

Having described the invention in detail and by reference to preferred embodiments thereof, it will be apparent that modifications and variations are possible without departing from the scope of the appended claims.

What is claimed is:

1. Method of making a part comprising a plastic substrate having a show surface with a paint film disposed over a portion of said show surface to reveal a portion of said substrate on said show surface, said method comprising:

providing a mold cavity having a surface area thereof interrupted by a ridge-like protrusion;

providing a paint film having an edge portion thereof;

positioning said edge of said paint film alongside said ridge-like protrusion in said mold cavity; and injecting molding plastic into said mold cavity and behind said paint film, said molten plastic extending under said paint film alongside said ridge-like protrusion, said ridge-like protrusion, upon contact with said paint film and said molten plastic, forming a channel in said molten plastic with said edge of said paint film tucked into said channel.

2. Method as recited in claim 1 further comprising placing a rope-like material into said channel adjacent said tucked edge of paint film.

3. Method of making a part comprising a plastic substrate material having a show surface with a paint film disposed over a portion of said substrate to reveal an exposed portion of said substrate or said show surface, said method comprising:

providing a mold cavity having a surface area thereof interrupted by first and second ridge members separated by a space extending along said mold cavity surface area;

providing a paint film having a pair of edge portions;

positioning said paint film in said space with each of said edges of said paint film adjacent one of said ridge members; and injecting molten plastic into said mold cavity and behind said paint film, said molten plastic extending under said paint film along said space and said ridge members, said ridge members, upon contact with said molten plastic and said paint film, forming a pair of channels in said molten plastic with each said edge of said paint film tucked into one of said channels.

4. Method as recited in claim 3 further comprising placing a rope-like material into each of said channels with each rope wedged adjacent one of said edges.

5. Method of making a plural component show face trim part by insert molding of a paint film over a plastic substrate to form a show face side surface of said part wherein a portion of said substrate is exposed on said show surface, said method comprising:

(a) providing a male mold member including a core portion and a female mold member having a surface defining a concavity therein, said male mold member and said female mold member together defining a mold cavity, said mold cavity including a groove forming member protruding a surface thereof;

(b) providing a paint film, said film comprising an edge defining an insert portion;

(c) inserting said film into said mold cavity and positioning said insert portion proximate to said groove forming member; and (d) injecting molten plastic into said mold cavity and against said film, whereby said film is superposed over said molten plastic such that said insert portion of said film is fixed to said plastic substrate proximate said groove forming member along a boundary between said plastic substrate and said film.

6. Method as recited in claim 5 wherein said boundary comprises a channel, said method further comprising provides said channel with an outboard wall and an inboard wall converging at a vertex and defining a generally V-cross-sectioned channel shape, said edge of said paint film extending along said inboard edge, converging said vertex and terminating along said outboard wall.

7. Method as recited in claim 5 wherein said boundary comprises a channel, said method further comprising providing said channel with an outboard wall and an inboard wall interconnected by a connecting leg wall having a radius configuration to define a generally U-cross-sectioned channel shape, said edge of said paint film extending along said inboard edge, through said connecting leg wall and terminating along said outboard leg.

8. Method as recited in claim 5 wherein said boundary comprises a channel, said method further comprising providing said channel with an outboard wall and an inboard wall and a connecting leg interconnecting said outboard wall and said inboard wall at a substantially normal angle, said edge of said paint film extending along said inboard edge, through said connecting wall and terminating along said outboard wall.

9. Method as recited in claim 5 wherein said groove forming member includes a nadir and wherein said edge of said paint film extends along said boundary and terminates in said plastic below said nadir.

10. Method as recited in claim 5 wherein said edge is contiguous to said nadir.

11. Method as recited in claim 5 wherein said groove forming member includes a longitudinal axis, said paint film extends along said boundary adjacent said nadir and in a substantially linear tangent parallel to said nadir at a substantially normal angle to said longitudinal axis of said groove forming member.

12. Method as recited in claim 5, further comprising forming said insert portion in said paint film such that said insert portion forms about a 90° angle with said show face side.

13. Method of making a plural component show face trim part by insert molding of a paint film over a plastic substrate to form a show face side surface of said part wherein a portion of said substrate is exposed on said show surface, said method comprising:

(a) providing a male mold member including a core portion and a female mold member having a surface defining a concavity therein; said male mold member and said female mold member together defining a mold cavity, said mold cavity including a plurality of groove forming members protruding from said surface of said female mold member;

(b) providing a paint film, said paint film comprising a plurality of edges with each of said edges defining an insert portion;

(c) placing said paint film into said mold cavity and positioning each said insert portion individually proximate to one of said groove forming members; and (d) injecting molten plastic into said mold cavity and against said paint film, whereby said paint film is superposed over said molten plastic such that said insert portions of said paint film are fixed to said plastic substrate proximate said respective groove forming member.

14. Method as recited in claim 13, further comprising; forming said insert portions in said paint film such that said insert portions form about a 90° angle with said show face side.

\* \* \* \* \*